United States Patent
Kim et al.

(10) Patent No.: US 7,512,053 B2
(45) Date of Patent: Mar. 31, 2009

(54) APPARATUS AND METHOD FOR MODULATING ADDRESS DATA, APPARATUS AND METHOD FOR DEMODULATING ADDRESS DATA THEREFOR, AND RECORDING MEDIUM FOR RECORDING MODULATED ADDRESS DATA

(75) Inventors: Jin-han Kim, Gyeonggi-do (KR); Jae-Seong Shim, Seoul (KR); Hyun-soo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 557 days.

(21) Appl. No.: 10/643,166

(22) Filed: Aug. 19, 2003

(65) Prior Publication Data
US 2004/0128608 A1 Jul. 1, 2004

(30) Foreign Application Priority Data
Aug. 21, 2002 (KR) .................. 10-2002-0049425

(51) Int. Cl.
*G11B 7/00* (2006.01)
(52) U.S. Cl. .............. 369/59.25; 369/53.35; 369/59.24; 369/275.4
(58) Field of Classification Search ............ 369/275.4, 369/44.13, 44.26, 47.14
See application file for complete search history.

(56) References Cited

U.S. PATENT DOCUMENTS

| | | | | |
|---|---|---|---|---|
| 6,069,870 A | * | 5/2000 | Maeda et al. ............ | 369/275.4 |
| 6,201,773 B1 | * | 3/2001 | Aoki ...................... | 369/44.13 |
| 6,608,810 B2 | * | 8/2003 | Minamino et al. ....... | 369/275.4 |
| 6,813,230 B1 | * | 11/2004 | Ko et al. ................. | 369/47.1 |
| 2002/0110067 A1 | * | 8/2002 | Kondo et al. ............ | 369/47.54 |
| 2003/0012123 A1 | * | 1/2003 | Miyamoto et al. ....... | 369/275.4 |
| 2003/0031103 A1 | * | 2/2003 | Kuribayashi et al. ..... | 369/47.17 |
| 2003/0107970 A1 | * | 6/2003 | Suh ........................ | 369/59.25 |
| 2003/0123343 A1 | * | 7/2003 | Schep et al. ............. | 369/44.26 |
| 2003/0179678 A1 | * | 9/2003 | Kobayashi ............... | 369/59.25 |
| 2004/0156291 A1 | * | 8/2004 | Heemskerk et al. ...... | 369/53.34 |
| 2005/0030854 A1 | * | 2/2005 | Lee et al. ................ | 369/47.22 |
| 2005/0099934 A1 | * | 5/2005 | Kondo et al. ............ | 369/275.4 |

FOREIGN PATENT DOCUMENTS

JP 2003-123267 4/2003

OTHER PUBLICATIONS

Office Action issued for Japanese Patent Application No. 2003-279143, on Jun. 13, 2006.

* cited by examiner

*Primary Examiner*—Wayne R Young
*Assistant Examiner*—Linh T Nguyen
(74) *Attorney, Agent, or Firm*—Stein, McEwen & Bui, LLP

(57) ABSTRACT

An apparatus and method to modulate address data of a disc type recording medium, include generating the address data, performing error correction coding of the address data and outputting coded address data, receiving the coded address data in a unit of at least two bits, generating a first modulated signal of the coded address data using a first modulation technique, generating a second modulated signal of the coded address data using a second modulating signal, and generating a unit wobble signal by synthesizing the first and second modulated signals.

22 Claims, 17 Drawing Sheets

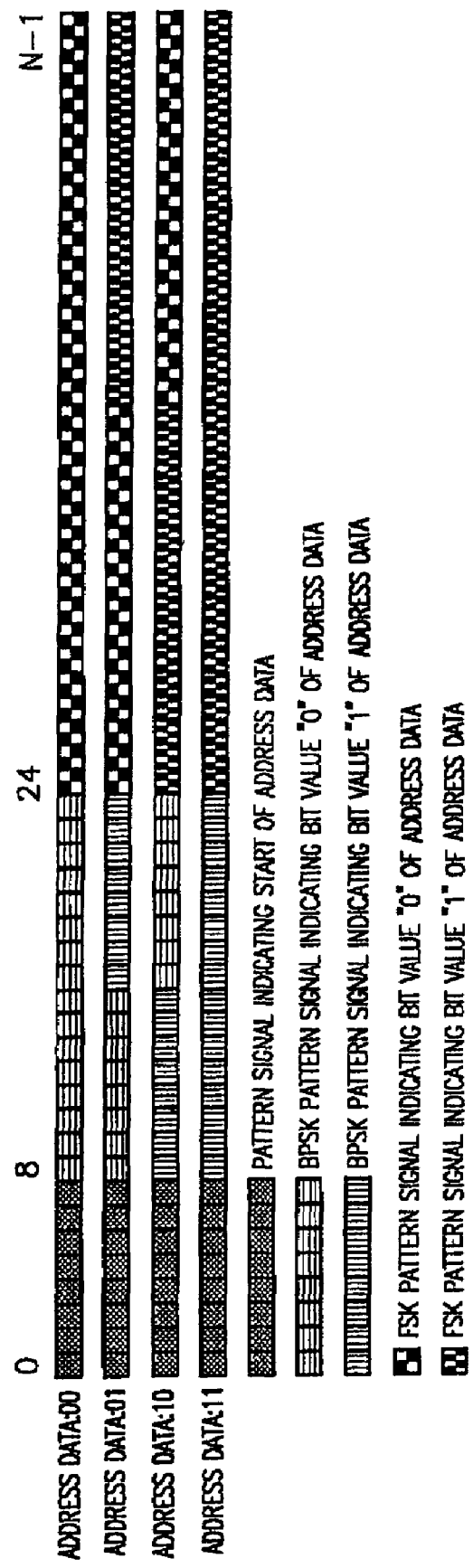

BPSK PATTERN SIGNAL INDICATING START OF ADDRESS DATA

BPSK OR FSK PATTERN SIGNAL INDICATING BIT VALUE "0" OF ADDRESS DATA

BPSK OR FSK PATTERN SIGNAL INDICATING BIT VALUE "1" OF ADDRESS DATA

FSK PATTERN SIGNAL INDICATING BIT VALUE "0" OF ADDRESS DATA

FSK PATTERN SIGNAL INDICATING BIT VALUE "1" OF ADDRESS DATA

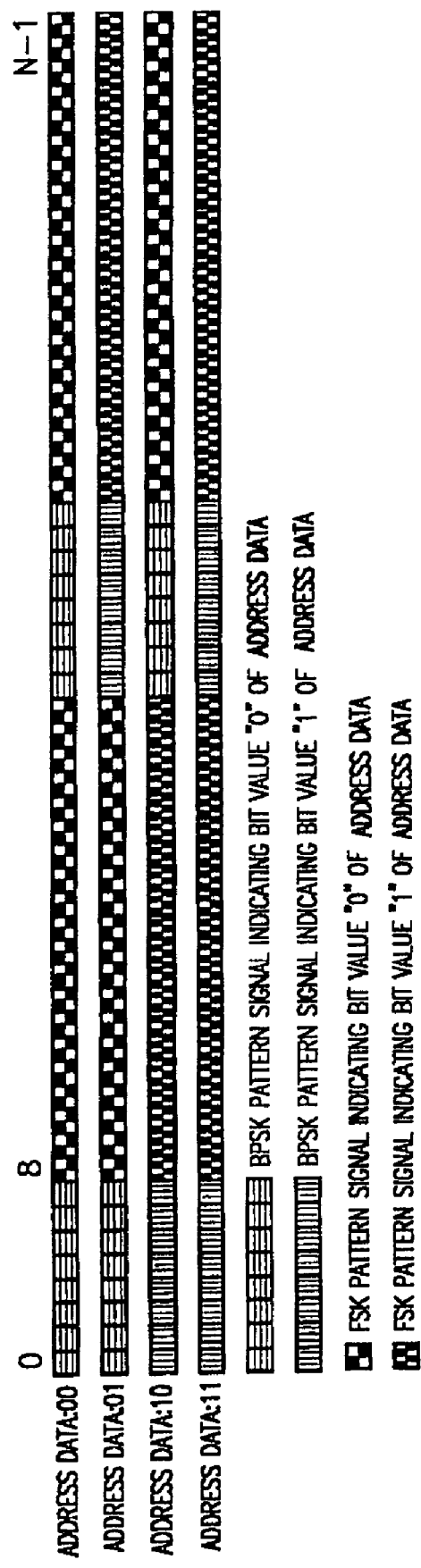

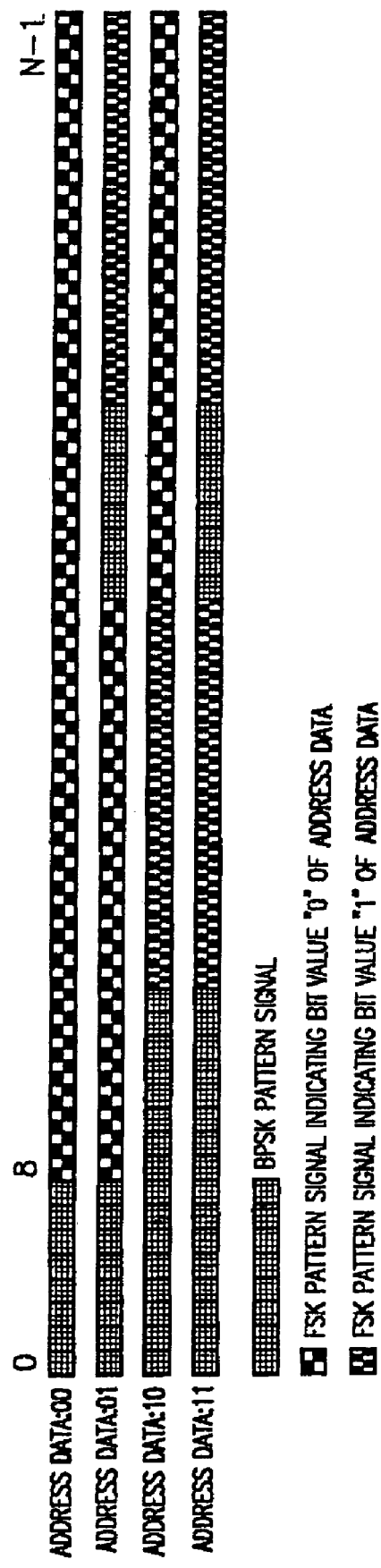

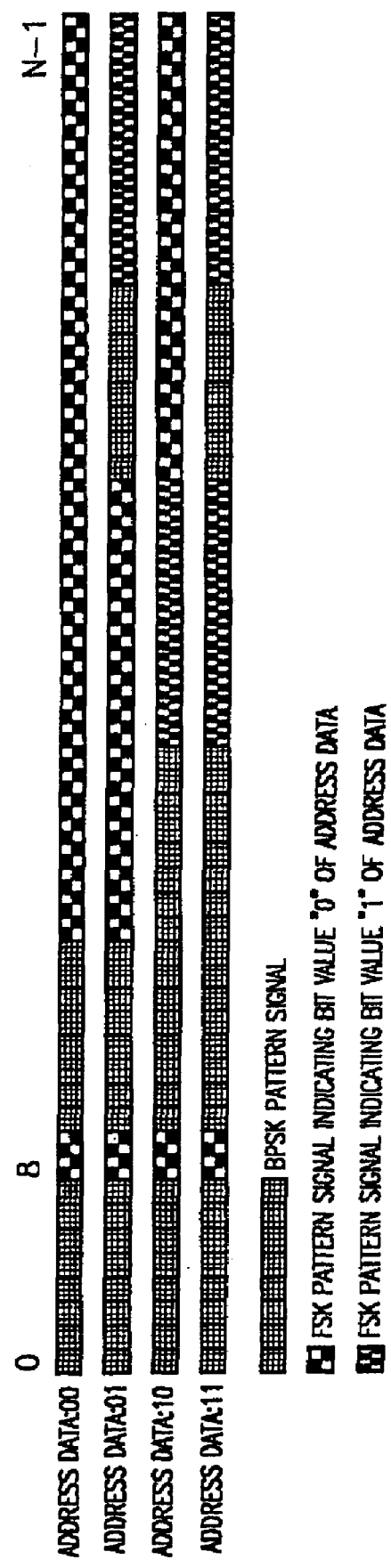

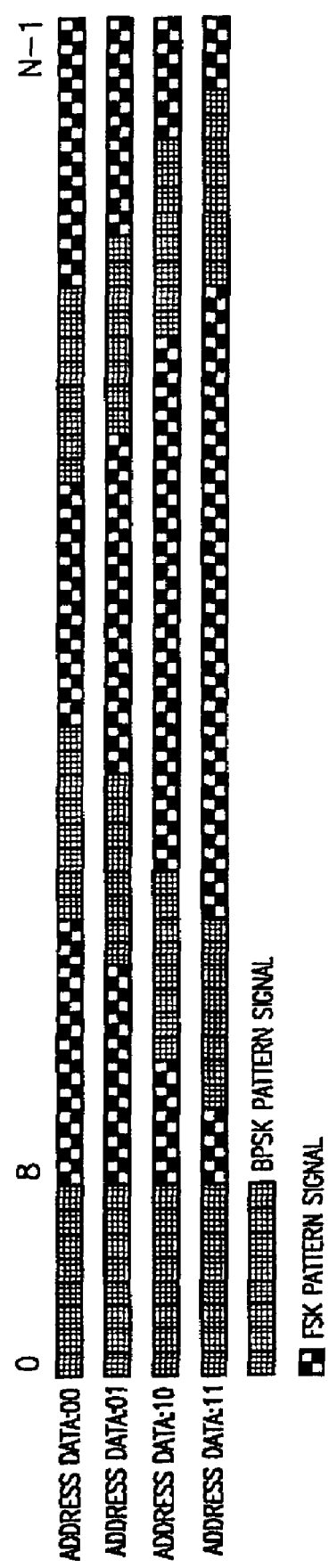

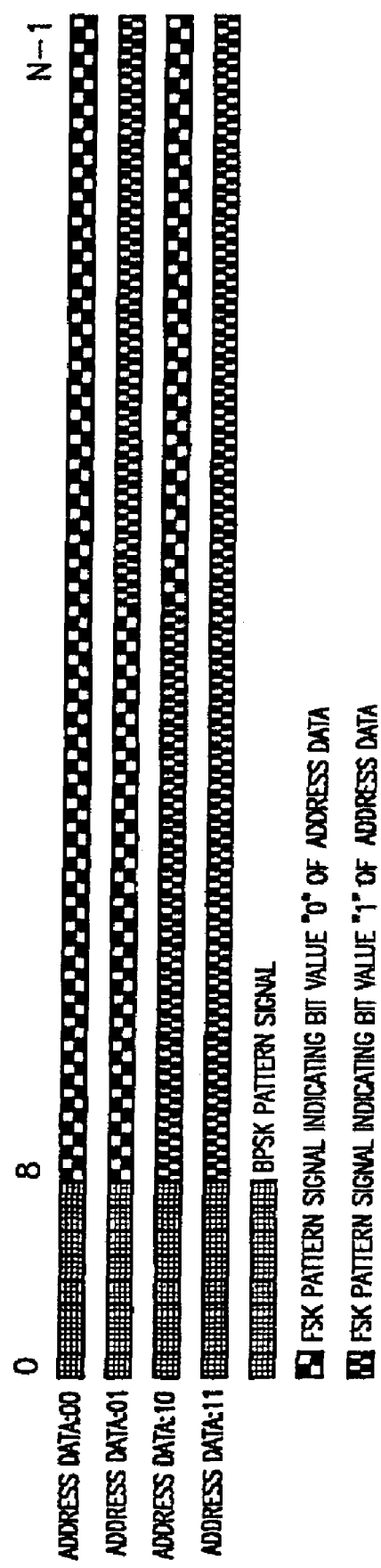

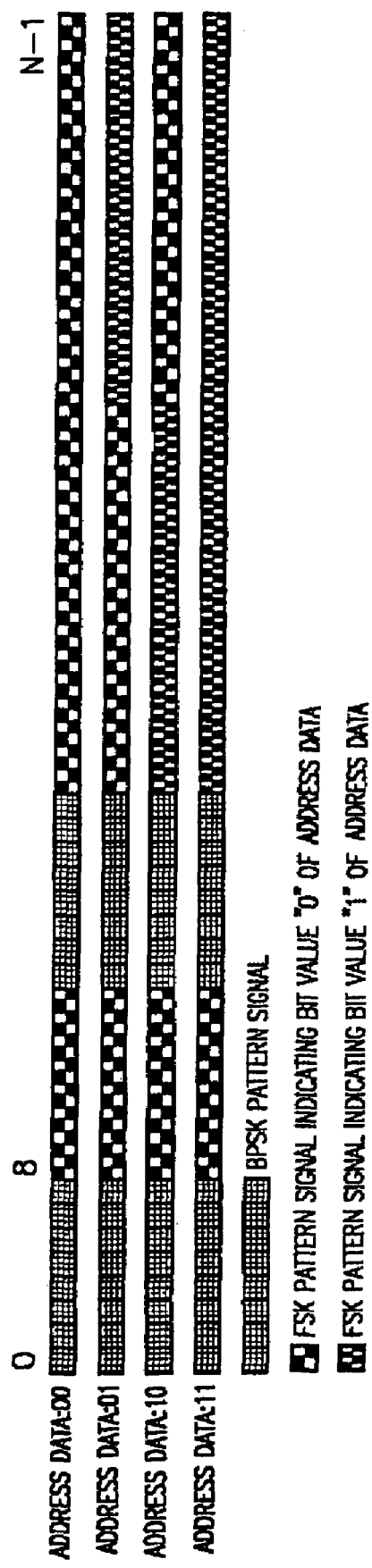

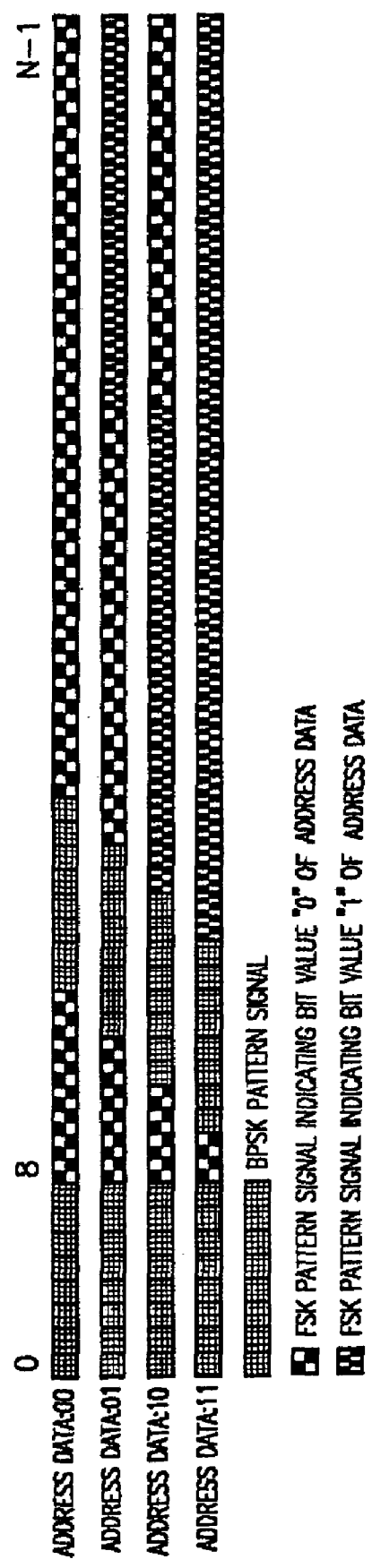

APPARATUS AND METHOD FOR MODULATING ADDRESS DATA, APPARATUS AND METHOD FOR DEMODULATING ADDRESS DATA THEREFOR, AND RECORDING MEDIUM FOR RECORDING MODULATED ADDRESS DATA

CROSS-REFERENCE TO RELATED APPLICATIONS

This application claims the priority of Korean Patent Application No. 2002-49425, filed Aug. 21, 2002 in the Korean Intellectual Property Office, the disclosure of which is hereby incorporated by reference in its entirety.

BACKGROUND OF THE INVENTION

1. Field of the Invention

The present invention relates to an apparatus and method to modulate address data and an apparatus and method to demodulate the address data therefor, and more particularly, to an apparatus and method to modulate address data, by which the address data of data to be recorded on a disc type recording medium is modulated into a wobble signal and a disc track is shaped in a form of the wobble signal, and an apparatus and method to demodulate the address data therefor.

2. Description of the Related Art

In a disc type recording medium, such as a compact disc (CD), address data is recorded on a header region that is separate from a disc track on which data is recorded.

Recently a new approach to record the address data has been introduced, which involves recording the address data by modulating the address data into a wobble signal and shaping the disc track in a form of the wobble signal. The address data can be modulated into the wobble signal by using monotone wobble (MW), saw tooth wobble (STW), binary phase shift keying (BPSK), or frequency shift keying (FSK). Theses approaches are advantageous with respect to a disc access such as a motor speed control.

FIG. 1 is a view illustrating a conventional disc track shaped in a form of the wobble signal and pits formed in the disc track. By using MW, the address data is modulated into the wobble signal in a form of a sine wave with a single frequency while the pits are formed in a middle of the disc track, resulting in the disc track being shaped in the form of the wobble signal. The pits corresponding to one address are grouped as a unit recording block. Respective lengths of the unit recording block and the disc track including a unit recording block change with an amount of the data to be recorded in the unit recording block. In general, a length of the wobble signal indicating one address is equal to that of one unit recording block. In addition, the address data is modulated into a unit wobble signal that includes a predetermined number of carrier signals. Each bit of address data or additional data is modulated into the predetermined number of carrier signals. For example, each bit of address data or additional data may be modulated into the unit wobble signal that includes 56 carrier signals.

According to recent specifications for high-density DVDs, 64 kbits of data are recorded based on the address the data indicated by the unit wobble signal. Thus, if one address is affected by a defect in a disk track, 64 kbits of data are inaccessible. In the case of high-density DVDs, capable of recording data in the tens of Gbits, the damage to the 64 kbits of data is not a big problem compared to a case of the disc with a small recording capacity. In order to solve such a problem, the amount of data recorded at one address may be reduced. In this case, a length of the unit recording block is reduced in accordance with a reduction in the amount of recorded data. However, the length of the unit wobble signal indicating one address does not change. Thus, discrepancy occurs between the length of address data indicated by the unit wobble signal and the length of data to be recorded at the address. Moreover, according to the conventional disc tract described above, because the unit wobble signal including predetermined number of carrier signals indicates one bit of address data, reducing the length of the wobble signal indicating one bit of address data to equalize the length of the wobble signal with a reduced length of the unit recording block does not make it possible to indicate one bit of address data with the unit wobble signal.

SUMMARY OF THE INVENTION

The present invention provides an apparatus and method to modulate address data by which the address data of at least two bits is modulated into a unit wobble signal and a length of address data on a disc track is reduced, which is shaped in a form of the unit wobble signal, thereby reducing inaccessibility to data as a result of a defect in a disc track.

The present invention also provides an apparatus and method to demodulate address data, thereby reducing inaccessibility to data as a result of a defect in a disc track.

According to an aspect of the present invention, there is provided an apparatus to modulate address data of a disc-type recording medium, the apparatus including an address data generating unit generating the address data; an error correction coding unit performing error correction coding of the address data received from the address data generating unit and outputting coded address data; a modulating unit generating a first modulated signal of the coded address data using a first modulation technique and a second modulated signal of the coded address data using a second modulation technique, after receiving coded address data in a unit of at least two bits from the error correction coding unit; and a wobble signal generating unit generating a unit wobble signal by synthesizing the first and second modulated signals received from the modulating unit.

According to another aspect of the present invention, there is provided a method to demodulate address data of a disc type recording medium, the method including after receiving a unit wobble signal indicating the address data of at least two bits, which is generated by a synthesizing signal modulated by using first and second modulation techniques, demodulating using the first demodulation technique the signal modulated by the first modulation technique into data of the at least two bits, and demodulating using the second demodulation technique the signal modulated using the second modulation technique into the data of the at least two bits; determining the address data based on the data demodulated by using the first and second demodulation techniques; if values of the data of the at least two bits demodulated by using the first and second demodulation techniques are different from each other, generating an eraser flag signal indicating mismatched bit positions; and outputting the address data after performing error correction decoding on the address data and after generating the eraser flag signal.

According to yet another aspect of the present invention, there is provided an apparatus to demodulate address data of a disc type recording medium, the apparatus including a demodulating unit, after receiving a unit wobble signal indicating the address data of at least two bits generated by synthesizing signals modulated by first and second modulation techniques, demodulating using the first demodulation technique, the signal modulated by using the first modulation technique into data of the at least two bits, and demodulating using the second demodulation technique the signal modulated by using the second modulation technique into data of the at least two bits; a data determining unit determining the address data based on the data demodulated by using the first and second demodulation techniques and generates an eraser flag signal indicating mismatched bit positions if values of the data demodulated by using the first and second demodulation techniques are different from each other; and an error correction decoding unit performing error correction decoding of the determined address data and the eraser flag signal.

Additional aspects and advantages of the invention will be set forth in part in the description which follows and, in part, will be obvious from the description, or may be learned by practice of the invention.

BRIEF DESCRIPTION OF THE DRAWINGS

These and or other aspects and advantages of the invention will become apparent and more readily appreciated from the following description of the preferred embodiments taken in conjunction with the accompanying drawings in which:

FIGS. 3A and 3B are views illustrating a unit wobble signal generated by a method of modulating the address data, according to a first aspect of the present invention;

FIG. 6 is a view illustrating the unit wobble signal generated by the method of modulating the address data, according to a second aspect of the present invention;

FIGS. 7A and 7B are views illustrating the unit wobble signal generated by the method of modulating the address data, according to a third aspect of the present invention;

FIG. 8 is a view illustrating the unit wobble signal generated by the method of modulating the address data, according to a fourth aspect of the present invention;

FIGS. 9A and 9B are views illustrating the unit wobble signal generated by the method of modulating the address data, according to a fifth aspect of the present invention;

FIGS. 10A through 10D are views illustrating the unit wobble signal generated by the method of modulating the address data, according to a sixth aspect of the present invention;

DETAILED DESCRIPTION OF THE PREFERRED EMBODIMENTS

Figure 1:
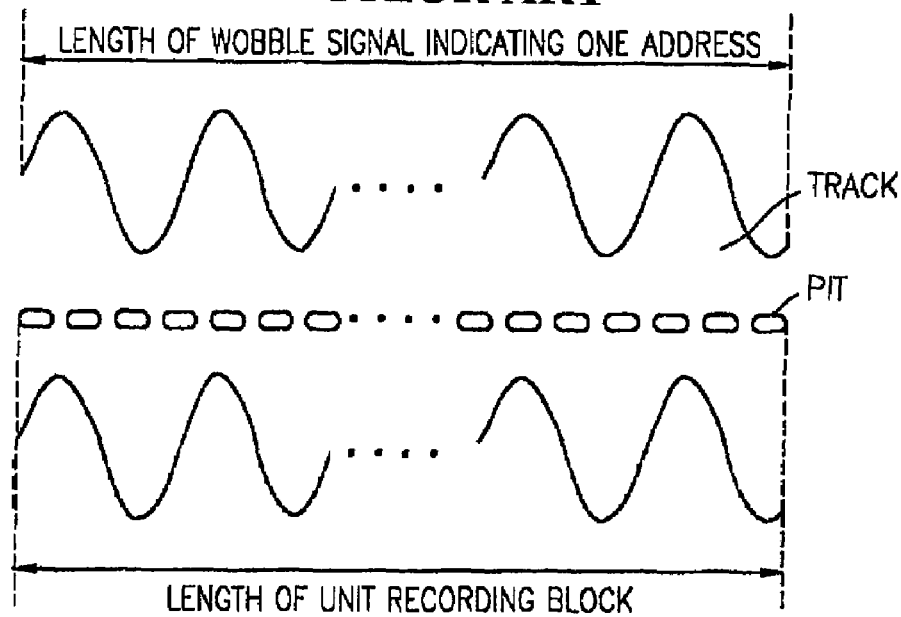
FIG. 1 is a view illustrating a conventional disc track shaped in a form of a wobble signal and pits formed in the disc track.

Reference will now be made in detail to the present preferred aspects of the present invention, examples of which are illustrated in the accompanying drawings, wherein like reference numerals refer to the like elements throughout. The aspects are described below in order to explain the present invention by referring to the figures.

A unit wobble signal is a portion of a wobble signal output from a wobble signal generating unit 140 and includes pattern signals that are modulated from when a pattern signal is generated, indicating a start of address data, to right before another pattern signal is generated, indicating the start of a next address data.

Hereinafter, a configuration and operation of an apparatus to modulate the address data, according to an aspect of the present invention, will be described with reference to FIGS. 2 through 10D.

Figure 2:
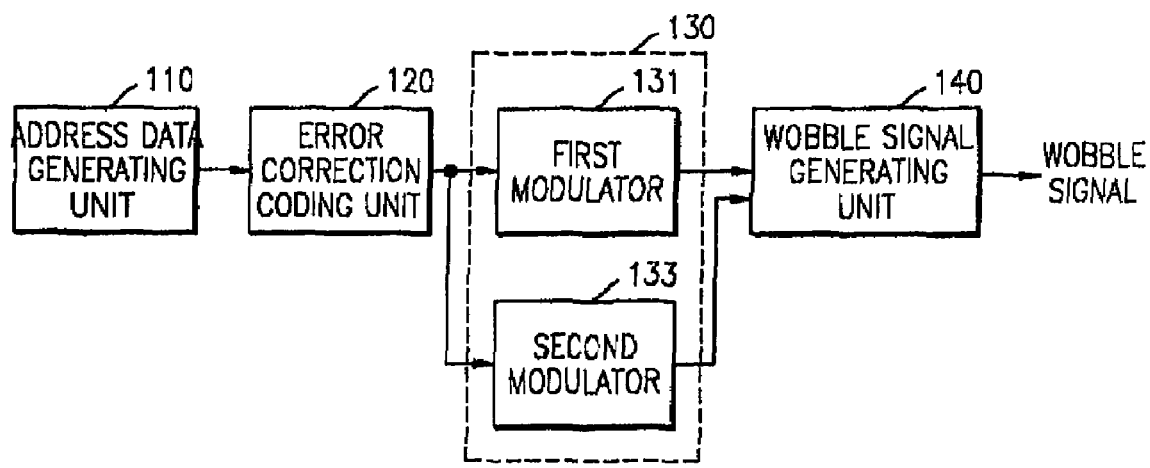
FIG. 2 is a block diagram of an apparatus to modulate address data, according to an aspect of the present invention.

FIG. 2 is a block diagram of the apparatus to modulate the address data according to an aspect of the present invention, where the apparatus to modulate the address data includes an address data generating unit 110, an error correction coding unit 120, a modulating unit 130, and the wobble signal generating unit 140. The modulating unit 130 includes a first modulator 131 and a second modulator 133.

The address data generating unit 110 generates the address data in a predetermined order. The address data may include various additional data. A number of bits of the address data indicating one address is determined based on a number of unit recording blocks and the additional data. For example, the number of bits of the address data indicating one address may be 32 bits.

The error correction coding unit 120 receives the address data from the address data generating unit 110 and performs error correction coding (ECC), e.g., Reed-Solomon coding. For example, if the address data is coded into an RS code (15, 9, 7), the coded address data is formed from a total of fifteen symbols including six parity symbols and nine data symbols added thereto. When the address data coded into the RS code (15, 9, 7) is decoded, at least three error data symbols are corrected. If there is an eraser flag signal in the error data, a maximum number of corrected error data symbols is six, the same as the number of parity symbols.

The modulating unit 130 receives the address data coded by the error correction coding unit 120 and generates first and second modulated signals by using first and second modulation techniques. The modulating unit 130 receives and modulates the coded address data in a unit of two bits. However, the modulating unit 130 may process the address data in the unit of more than two bits. In order to indicate the address data of two bits using one unit wobble signal, address data of two bits that is coded by the error correction coding unit 120 is input to the first and second modulators 131 and 133. The first modulator 131 receives the address data of two bits and modulates the address data of two bits using the first modulation technique, in accordance with a predetermined modulating algorithm. The second modulator 133 also receives the address data of two bits and modulates the address data of two bits by using the second modulation technique, in accordance with the predetermined modulating algorithm. A third modulation technique may be includes where OOK (On-Off Shift Keying) may be used. An amplitude "1" of a rectangular signal represents data bit "1" and the amplitude "1" represents data bit "0."

FIGS. 3A through 10D show unit wobble signals indicating the address data in a unit of two bits, which are generated by a method of modulating the address data, according to an aspect of the present invention. In FIGS. 3A through 10D, the first modulation technique is BPSK and the second modulation technique is FSK.

Figure 3B:
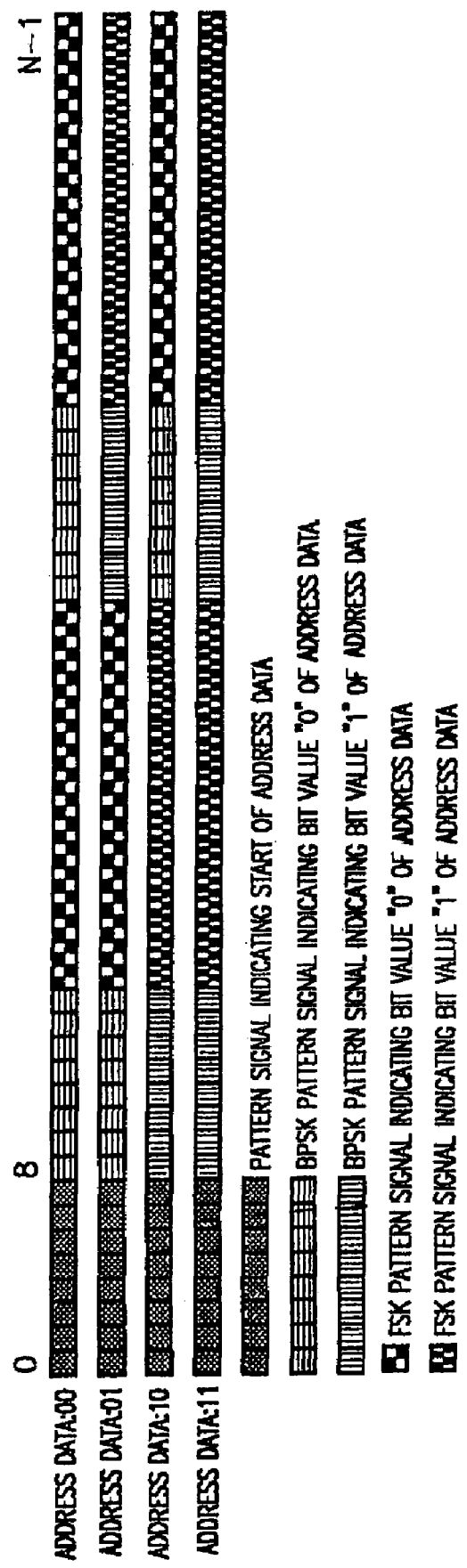

FIGS. 3A and 3B are views illustrating the unit wobble signal generated by the method of modulating the address data, according to a first aspect of the present invention. The unit wobble signal indicates a start of the address data of two bits by using BPSK and the actual address data of two bits by using BPSK or FSK. Each small box indicates a carrier signal, and one unit wobble signal includes N carrier signals. N may vary with a shape of a disc, such as a high-density DVD or a high-density disc of a small size, and specifications defining the indication of the address data.

Figure 4A:
FIGS. 4A through 4C are views illustrating an example of pattern signals formed by using binary phase shift keying (PBSK)
Figure 4B:
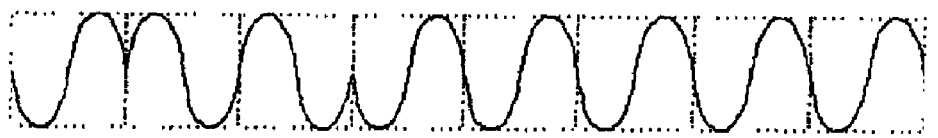
Figure 4C:
Figure 5A:
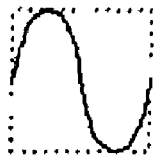
FIGS. 5A and 5B are views illustrating an example of the pattern signals formed by using frequency shift keying (FSK)
Figure 5B:
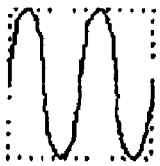

In FIGS. 3A and 3B, the unit wobble signal uses three pattern signals formed by using BPSK (hereinafter, referred to as BPSK pattern signals) and two pattern signals formed by using FSK (hereinafter, referred to as FSK pattern signals) for indication of the address data. FIGS. 4A through 4C show three pattern signals. FIG. 4A shows the BPSK pattern signal indicating the start of the address data of two bits. FIG. 4B shows the BPSK or FSK pattern signal indicating a bit value "0" of the address data of two bits. FIG. 4C shows the BPSK or FSK pattern signal indicating a bit value "1" of address data of two bits. Each BPSK or FSK pattern signal includes eight carrier signals. FIGS. 5A and 5B show two FSK pattern signals. FIG. 5A shows the FSK pattern signal indicating the bit value "0" of the address data of 2 bits, by using a frequency "f". FIG. 5B shows the FSK pattern signal indicating the bit value "1" of the address data of 2 bits, by using a frequency "2f".

In FIG. 3A, the BPSK pattern signal is immediately followed by another BPSK pattern signal. In FIG. 3B, by contrast, the BPSK and FSK pattern signals alternate in the unit wobble signal.

FIG. 6 is a view illustrating the unit wobble signal generated by the method of modulating address data, according to a second aspect of the present invention. The unit wobble signal indicates the start of the address data of two bits by using the BPSK pattern signals and the address data of two bits by using the BPSK or FSK pattern signals. As compared with the first aspect of the present invention shown in FIGS. 3A and 3B, the start of the address data of two bits is not indicated by using the BPSK pattern signal, but by using BPSK signals indicating the bit value "0" or "1" of the address data of two bits.

FIGS. 7A and 7B are views illustrating the unit wobble signal generated by the method of modulating address data, according to a third aspect of the present invention. The unit wobble signal indicates the start of the address data of two bits by using the BPSK pattern signal or a combination of the BPSK and FSK pattern signals. The address data formed of different bit values, such as "01" or "10," is designated by inserting the BPSK pattern signal in specific locations, such as next to the pattern signal indicating the start of the address data of two bits or next to the FSK pattern signal. The address data formed of the same bit value, such as "00" or "11," is designated by repeating one FSK pattern signal indicating the same bit value "0" or "1".

FIG. 8 is a view illustrating the unit wobble signal generated by the method of modulating address data, according to a fourth aspect of the present invention. The unit wobble signal indicates the start of the address data of two bits by using the BPSK pattern signal, and the actual address data of two bits by inserting the BPSK pattern signal in specific locations and inserting the FSK pattern signal between the BPSK pattern signals.

Figure 9A:
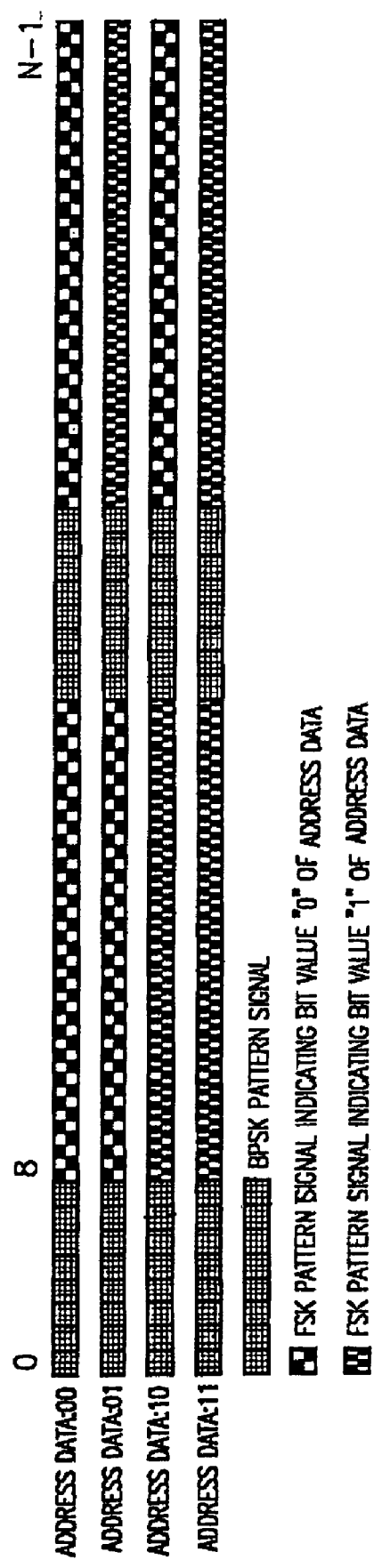

FIGS. 9A and 9B are views illustrating the unit wobble signal generated by the method of modulating the address data, according to a fifth aspect of the present invention. The unit wobble signal indicates the start of each bit of the address data of two bits, or the start of the address data of two bits by using the BPSK pattern signal and the actual address data of two bits by using the FSK pattern signals.

FIGS. 10A through 10D are views illustrating the unit wobble signal generated by the method of modulating the address data, according to a sixth aspect of the present invention.

Figure 10A:
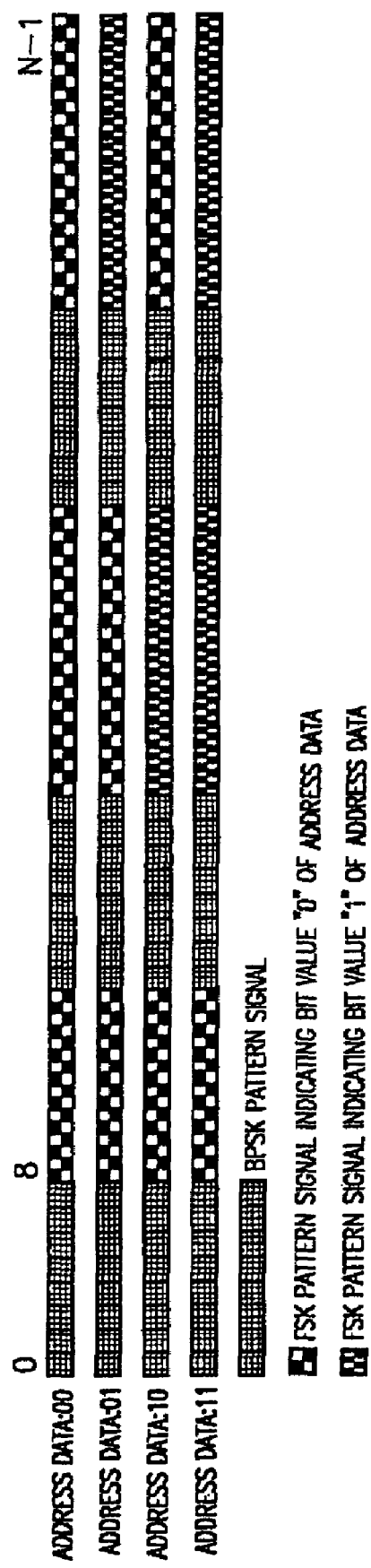

In FIG. 10A, the unit wobble signal indicates the start of the address data of two bits by using three pattern signals and the actual address data of two bits by using the FSK pattern signals indicating the bit value "0" or "1". The two FSK pattern signals indicating the bit value "0" or "1," respectively, are distinguished by inserting the BPSK pattern signal between the two FSK pattern signals.

Figure 10B:
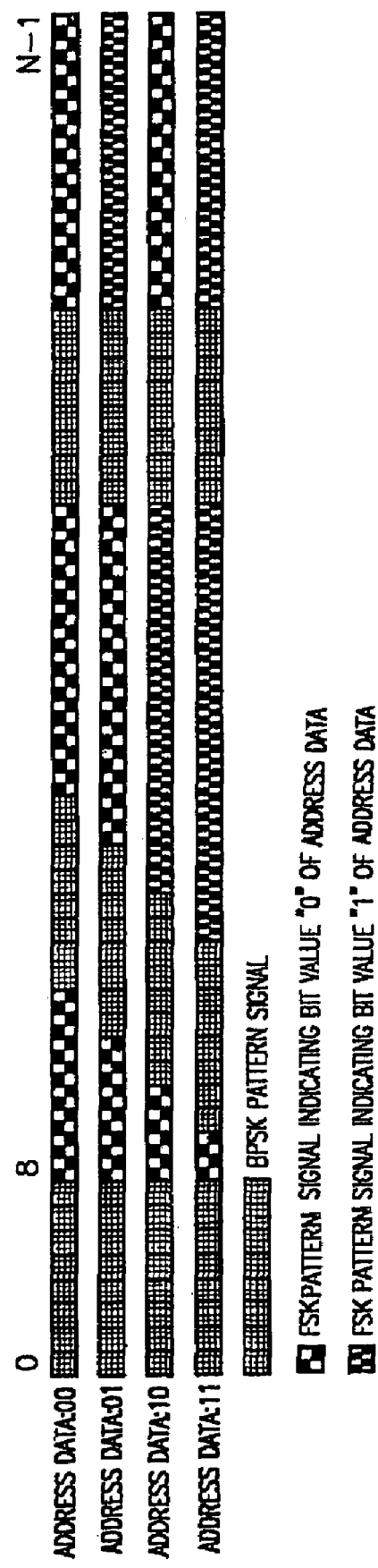

In FIG. 10B, the unit wobble signal indicates the start of the address data of two bits by using the BPSK pattern signal and the actual address data of two bits by disposing the FSK pattern signals in specific locations. The address data formed of the same bit value, such as "00" or "11," is designated by repeating one FSK pattern signal indicating the same bit value "0" or "1" and inserting the BPSK pattern signal between the FSK pattern signals indicating the same bit value.

FIG. 10C is different from FIG. 10A in that the BPSK pattern signal inserted between the FSK pattern signals is removed. FIG. 10D is different from FIG. 10B in that the BPSK pattern signal inserted between the FSK pattern signals is removed.

In order to generate the BPSK or FSK pattern signals used by the unit wobble signals, according to the first through sixth aspects of the present invention, the first modulator 131 generates the BPSK pattern signals, and the second modulator 133 generates the FSK pattern signals.

The wobble signal generating unit 140 receives the generated BPSK or FSK pattern signals, synthesizes the BPSK or FSK pattern signals in accordance with the predetermined algorithm, and generates the unit wobble signals shown in FIG. 3A, FIG. 3B, and FIGS. 6 through 10D.

Hereinafter, an apparatus to demodulate the address data, according to an aspect of the present invention, will be described with reference to FIG. 11.

Figure 11:
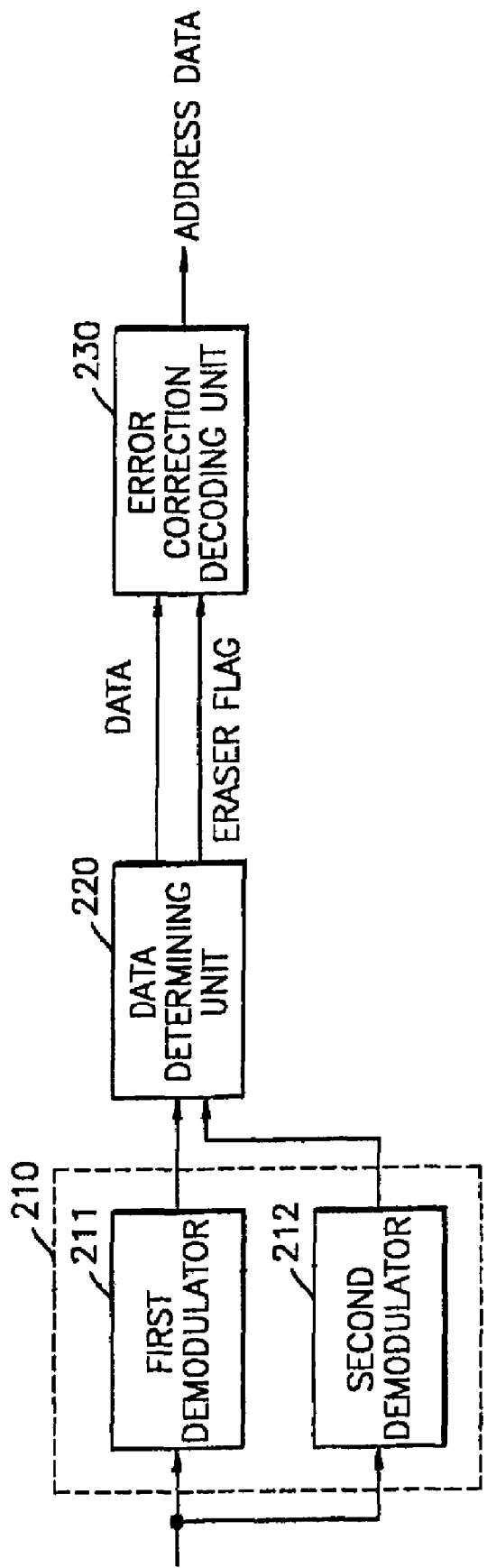
FIG. 11 is a block diagram of an apparatus to demodulate the address data, according to an aspect of the present invention.

Referring to FIG. 11, the apparatus to demodulate the address data, according to an aspect of the present invention, includes a demodulating unit 210, a data determining unit 220, and an error correction decoding unit 230. The demodulating unit 210 includes a first demodulator 211 and a second demodulator 212.

When the apparatus to demodulate the address data reads the unit wobble signals, previously modulated by the apparatus to modulate the address data in FIG. 2, from the disc and demodulates the unit wobble signal, a demodulating operation is performed in a reverse order of the modulating operation described above.

The demodulating unit 210 receives the wobble signal read from the disc (not shown) on which the address data is recorded in the form of the wobble signals, by a pick-up (not shown) having an optical head. The unit wobble signal includes at least one unit wobble signal among the unit wobble signals shown in FIG. 3A, FIG. 3B, and FIGS. 6 through 10D. The wobble signal is input to both the first demodulator 211 and the second demodulator 212 by which the unit wobble signal including the wobble signal is demodulated. The first demodulator 211 demodulates the pattern signal modulated by using the first modulation technique BPSK, and the second demodulator 212 demodulates the pattern signal modulated by using the second modulation technique FSK.

The data determining unit 220 receives 2-bit values of the address data demodulated by the demodulating unit 210 and interprets the address data. If the address data of two bits is indicated by using the two modulation techniques of BPSK and FSK, as shown in FIGS. 3A and 3B, then two-bit values of the address data, for example, "00," "01," "10," and "11" are input to the data determining unit 220, from both the first demodulator 211 and the second demodulator 212. If the two-bit values input to the first and second modulators 211 and 212 are different from each other, the data determining unit 220 generates the eraser flag signal indicating that an error exists in a specific location of the data, and outputs one of the two-bit values with the eraser flag signal to the error correction decoding unit 230. For example, if the two-bit value input to the first demodulator 211 is "10," but the two-bit value input to the second demodulator 212 is "11," the data determining unit 220 outputs either the two-bit value "10" or "11" with the eraser flag signal to the error correction decoding unit 230. The error flag signal indicates that the error exists in a second bit value position of the two-bit value. Generating the eraser flag signal can improve the error correction capability of the error correction decoding unit 230.

The error correction decoding unit 230 receives the two-bit value and the eraser flag signal, performs error correction decoding, and outputs the address data. The error correction decoding is dependent on the error correction coding and may be the Reed-Solomon decoding.

Hereinafter, a method to modulate the address data, according to an aspect of the present invention, will be described with reference to FIGS. 2 through 10D and FIG. 12.

Figure 12:
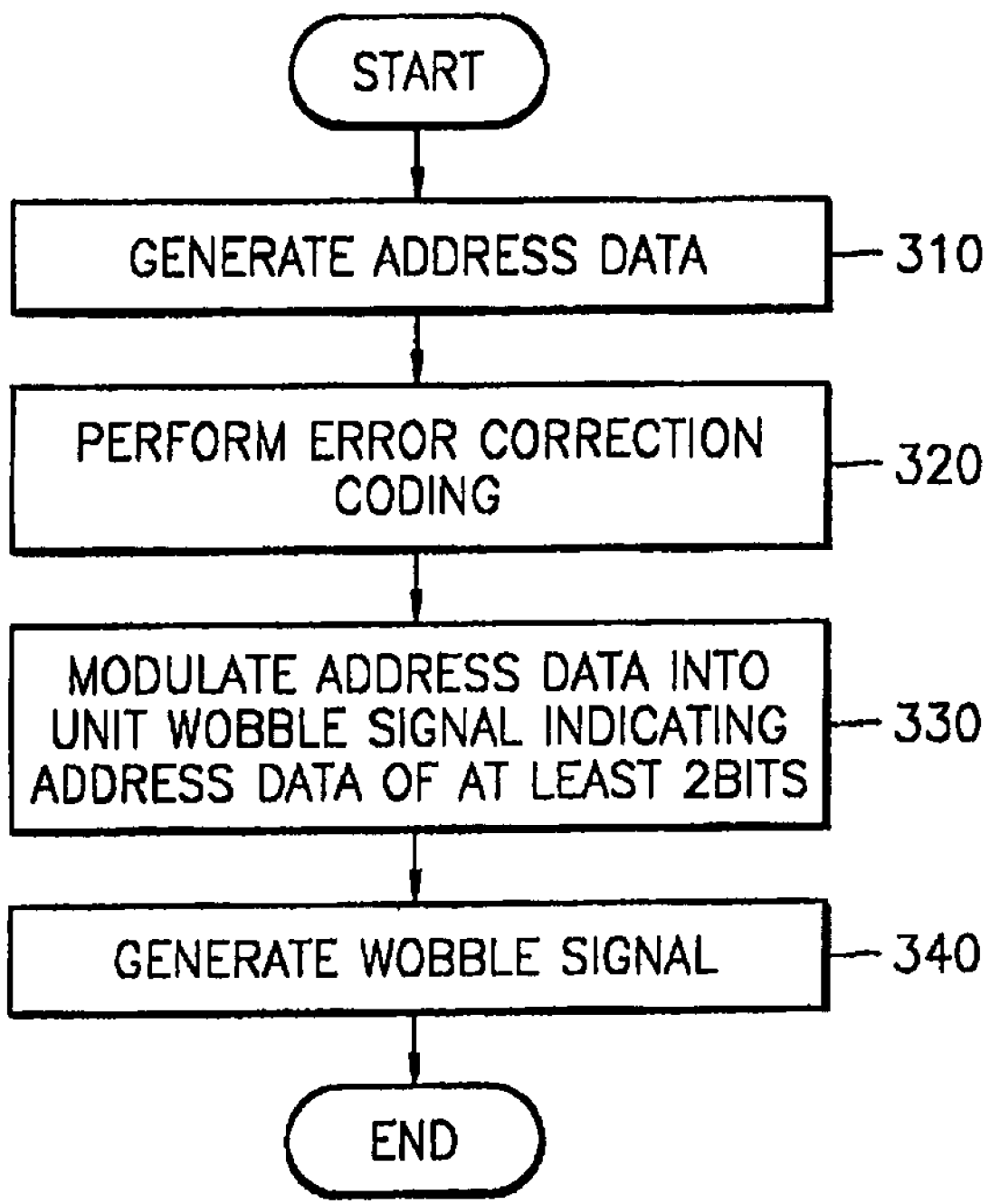
FIG. 12 is a flowchart showing a method to modulate the address data, according to an aspect of the present invention.

FIG. 12 is a flowchart showing the method to modulate address data used by the apparatus to modulate the address data of FIG. 2, according to an aspect of the present invention.

First, at operation 310, the address data generating unit 110 generates the address data in a predetermined order.

Next, at operation 320, the error correction coding unit 120 performs the error correction coding of the address data received from the address data generating unit 110. The error correction coding may be the Reed-solomon coding.

At operation 330, the modulating unit 130 modulates the coded address data received from the error correction coding unit 120 into the unit wobble signal indicating the address data of at least two bits. FIG. 3A, FIG. 3B, and FIGS. 6 through 10D show unit wobble signals indicating the address data of two bits.

At operation 340, the wobble signal generating unit 140 generates the unit wobble signal by synthesizing the pattern signals that have been generated from the first and second modulators 131 and 133, in accordance with the predetermined algorithm.

Hereinafter, a method to demodulate the address data, according to an aspect of the present invention, will be described with reference to FIGS. 3A through 11.

Figure 13:
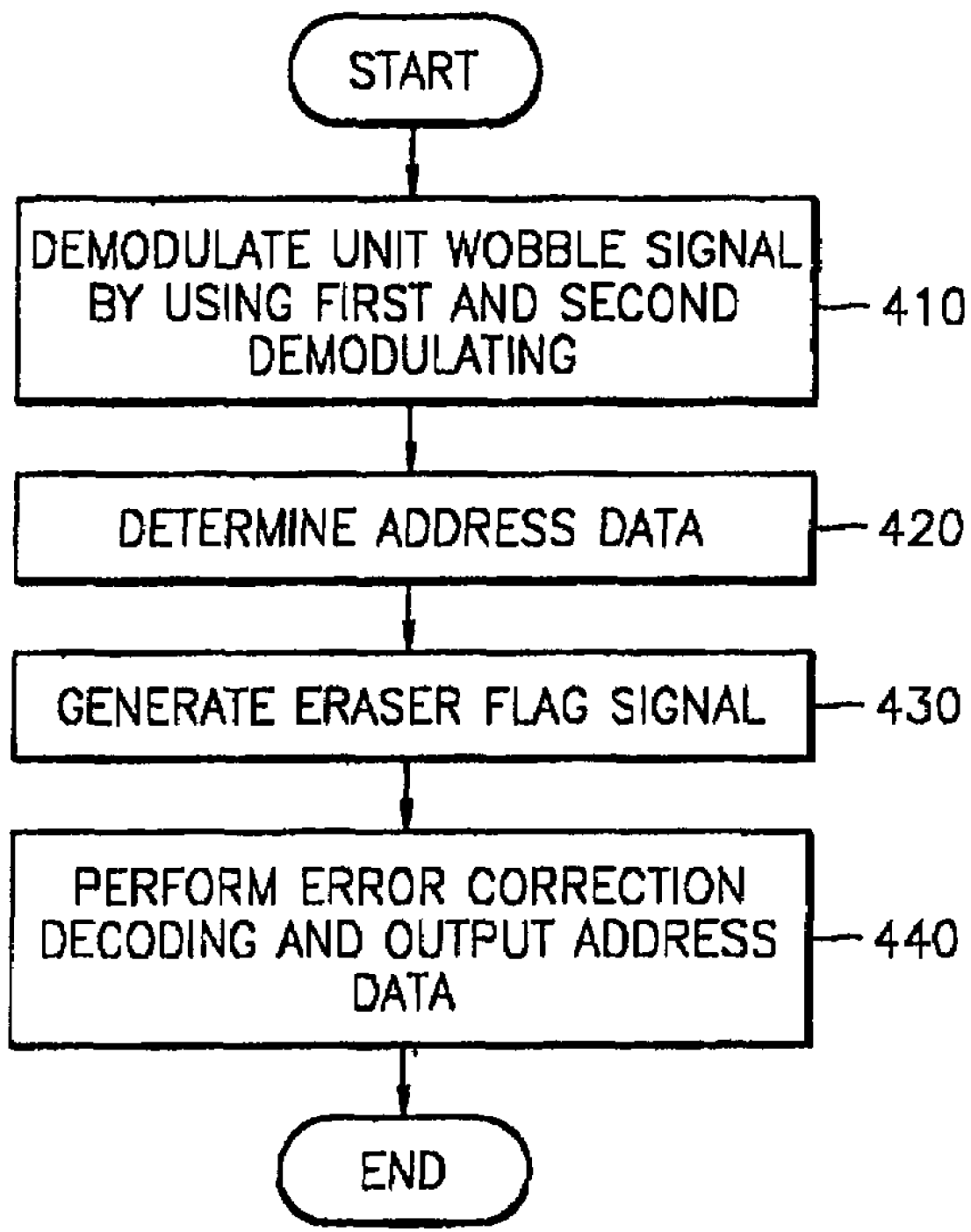
FIG. 13 is a flowchart showing a method to demodulate the address data, according to an aspect of the present invention.

FIG. 13 is a flowchart showing the method to demodulate address data used by the apparatus to demodulate the address data of FIG. 11, according to an aspect of the present invention.

First, at operation 410, the first and second demodulators 211 and 212 of the demodulating unit 210 demodulate the unit wobble signal of the wobble signal read from the disc, by using the first and second demodulation techniques. The unit wobble signal is one of the unit wobble signals shown in FIG. 3A, FIG. 3B, and FIGS. 6 through 10D. The first demodulator 211 demodulates the pattern signal modulated by using the BPSK, and the second demodulator 212 demodulates the pattern signal modulated by using the FSK.

Next, at operation 420, the data determining unit 220 determines the address data after receiving two-bit values of the address data demodulated by the demodulating unit 210.

At operation 430, if the two-bit values input to the first and second demodulators 211 and 212 are different from each other, the data determining unit 220 generates the eraser flag signal indicating that the error exists in a specific location of the two-bit values.

Thereafter, at operation 440, the error correction decoding unit 230 performs the error correction decoding of one of the two-bit values with the eraser flag signal received from the data determining unit 220 and outputs the address data. The error correction decoding may be the Reed-solomon decoding.

According to an aspect of the present invention, the present invention may be embodied in a general purpose digital computer by running a program from a computer readable recording medium. The computer readable recording medium includes but not limited to storage medium such as ROM's, RAM's, CD-ROMs, magnetic tapes, floppy discs, and optical data storage medium. In addition, the computer readable medium may be distributed in computer systems connected to networks, stored, and executed in the form of computer readable code.

As described above, according to an apparatus and a method to modulate address data and an apparatus and a method to demodulate address data therefor, a length of the address data on a disc track, which is shaped in the form of a unit wobble signal, is reduced by indicating an address of at least two bits with the unit wobble signal. Thus, it is possible to reduce damage to data as a result of a defect in the disc track. Also, more data can be recorded in the shape of the wobble signals, which allows an increase in an amount of data added to the address data.

Although a few aspects of the present invention have been shown and described, it would be appreciated by those skilled in the art that changes may be made in this aspects without departing from the principles and spirit of the invention, the scope of which is defined in the claims and their equivalents.

What is claimed is:

1. A method to modulate address data of a disc type recording medium, the method comprising:
generating the address data;
performing error correction coding of the address data and outputting coded address data;
receiving the coded address data; and
generating a unit wobble signal of the coded address data, the unit wobble signal corresponding to 2 bits of the coded address data,
wherein the unit wobble signal is alternatively one of at least four different unit wobble signals and has N carriers, and
wherein a first portion of the unit wobble signal is modulated by using a first type and second type of a first modulation method, and a second portion of the unit wobble signal is modulated by using a first type and a second type of a second modulation method.

2. The method of claim 1, wherein the generating of the unit wobble signal comprises generating at least two pattern signals indicating at least two-bit values of the coded address data using the first modulation method, and generating at least two signals used to distinguish signals indicating a bit value of the address data using the second modulation method, where the coded address data of at least two bits is indicated by disposing the at least two pattern signals in predetermined locations and inserting the at least two signals to distinguish signals indicating a bit value of the address data between the at least two pattern signals.

3. The method of claim 1, wherein the generating of the unit wobble signal comprises disposing the first portion of the unit wobble signal and the second portion of the unit wobble signal adjacent to each other.

4. The method of claim 1, wherein the generating of the unit wobble signal comprises alternating the first portion of the unit wobble signal and the second portion of the unit wobble signal.

5. The method of claim 1, further comprising: generating signals indicating each bit of the coded address data.

6. The method of claim 1, further comprising: generating a signal indicating a start of the coded address data using one of the first modulation method, the second modulation method, and a third modulation method.

7. The method of claim 1, wherein the first modulation method is binary phase shift keying (BPSK), and the second modulation method is frequency shift keying (FSK).

8. The method of claim 1, wherein N is 56.

9. An apparatus to reproduce a unit wobble signal of a coded address data of a disc-type recording medium, the apparatus comprising:

an optical pick-up reading the unit wobble signal; and a controller determining that the read unit wobble signal is any one among at least four different unit wobble signals, wherein the unit wobble signal is alternatively one of at least four different unit wobble signals and has N carriers, a first portion of the unit wobble signal is modulated by using a first type and a second type of a first modulation method and a second portion of the unit wobble signal is modulated by using a first type and a second type of a second modulation method, and the unit wobble signal corresponds to 2 bits of the coded address data.

10. The apparatus of claim 9, wherein:

the first portion of the unit wobble signal is modulated using the first modulation method by generating at least two pattern signals indicating at least two bit values of the coded address data;

the second portion of the unit wobble signal is modulated using the second modulation method by generating at least two signals to distinguish signals indicating a bit value of the address data; and the coded address data of at least two bits is indicated by disposing the at least two pattern signals in predetermined locations and inserting the at least two signals to distinguish the signals indicating a bit value of the address data between the at least two pattern signals.

11. The apparatus of claim 9, wherein the first portion of the unit wobble signal and the second portion of the unit wobble signal are adjacent to each other.

12. The apparatus of claim 9, wherein the first portion of the unit wobble signal and the second portion of the unit wobble signal are alternated.

13. The apparatus of claim 9, wherein the second modulation method generates signals indicating each bit of the coded address data.

14. The apparatus of claim 9, wherein a signal indicating a start of the coded address data is generated using one of the first modulation method, the second modulation method, and a third modulation method.

15. apparatus of claim 9, wherein the first modulation method is a binary phase shift keying (BPSK) and the second modulation method is a frequency shift keying (FSK).

16. The method of claim 9, wherein N is 56.

17. A computer readable storage medium controlling a computer and having recorded thereon address data modulated by a process of:

generating the address data;

performing error correction coding of the address data and outputting coded address data;

receiving the coded address data; and generating a unit wobble signal of the coded address data, wherein the unit wobble signal is alternatively one of at least four different unit wobble signals and has N carriers, a first portion of the unit wobble signal is modulated by using a first type and a second type of a first modulation method and a second portion of the unit wobble signal is modulated by using a first type and a second type of a second modulation method, and the unit wobble signal corresponds to 2 bits of the coded address data.

18. The computer readable storage medium of claim 17, wherein the generating of the unit wobble signal comprises generating at least two pattern signals indicating at least two-bit values of the coded address data using the first modulation method, and generating at least two signals used to distinguish signals indicating a bit value of the address data using the second modulation method, where the coded address data of at least two bits is indicated by disposing the at least two pattern signals in predetermined locations and inserting the at least two signals to distinguish signals indicating a bit value of the address data between at least two pattern signals.

19. The computer readable storage medium of claim 17, wherein the generating of the unit wobble signal comprises disposing the first portion of the unit wobble signal and the second portion of the unit wobble signal adjacent to each other.

20. The computer readable storage medium of claim 17, wherein the generating of the unit wobble signal comprises alternating the first portion of the unit wobble signal and the second portion of the unit wobble signal.

21. The computer readable storage medium of claim 17, further comprising:

generating signals indicating each bit of the coded address data.

22. The method of claim 17, wherein N is 56.

* * * * *